US008734603B2

(12) United States Patent
Tsioptsias et al.

(10) Patent No.: US 8,734,603 B2
(45) Date of Patent: May 27, 2014

(54) METHOD FOR PRODUCING A FRICTION ELEMENT

(75) Inventors: Zisis Tsioptsias, Gmunden (AT); Gerhard Hartner, Bad Wimsbach (AT)

(73) Assignee: Miba Frictec GmbH, Roitham (AT)

( * ) Notice: Subject to any disclaimer, the term of this patent is extended or adjusted under 35 U.S.C. 154(b) by 9 days.

(21) Appl. No.: 13/309,093

(22) Filed: Dec. 1, 2011

(65) Prior Publication Data

US 2012/0160629 A1  Jun. 28, 2012

(30) Foreign Application Priority Data

Dec. 3, 2010  (AT) ................. A 2015/2010

(51) Int. Cl.
*F16D 13/22* (2006.01)
*B32B 15/04* (2006.01)

(52) U.S. Cl.
USPC ........... 148/579; 148/217; 148/400; 148/206; 148/284; 148/240; 148/238

(58) Field of Classification Search
USPC .......... 148/217, 579, 400, 206, 284, 240, 238
See application file for complete search history.

(56) References Cited

U.S. PATENT DOCUMENTS

| 4,158,579 | A | 6/1979 | Foreman et al. |
| 5,346,560 | A | 9/1994 | Mournet et al. |
| 6,212,930 | B1 | 4/2001 | Skrabs et al. |
| 6,318,534 | B1 | 11/2001 | Zimprich |
| 2001/0032761 | A1* | 10/2001 | Ruiz ...................... 188/218 XL |
| 2008/0000550 | A1 | 1/2008 | Holly et al. |

FOREIGN PATENT DOCUMENTS

| DE | 1 012 946 | 8/1957 |
| DE | 157 58 26 | 7/1969 |
| DE | 199 06 980 | 9/2000 |
| DE | 10 2007 027 933 | 1/2008 |
| EP | 0 497 663 | 8/1992 |
| EP | 1 396 553 | 3/2004 |
| WO | WO 97/32678 | 9/1997 |
| WO | WO 2009/132369 | 11/2009 |

OTHER PUBLICATIONS

European Search Report dated Apr. 19, 2012 in European Application No. EP 11 19 1711 with English translation of relevant parts.
"A Project Report on Heat Treatment of Low Carbon Steel", S. K. Jaypuria, paper for Department of Mechanical Engineering National Institute of Technology Rourkela, Session 2008-09.
"Heat Treater's Guide: Practices and Procedures for Irons and Steels", Tempering Processes/Technology pp. 96-110, ASM International, 1995.
"Salt Bath Heat Treating of Non-Ferrous Metals", Robert A. Toombs, Industrial Heating, Sep. 1997, pp. 75-76, 78-80.

(Continued)

*Primary Examiner* — Rebecca Lee
(74) *Attorney, Agent, or Firm* — Collard & Roe, P.C.

(57) ABSTRACT

The invention relates to a method for producing a friction element (3) comprising the steps:
  providing a metal main body (10),
  hardening the main body (10) on at least part of its surface (11, 12) in a salt bath,
wherein the salt bath hardening is the final method step, and no further processing of the hardened surface (11, 12) is performed. Furthermore, the invention relates to a friction element produced according to this method and a friction component comprising the latter.

7 Claims, 4 Drawing Sheets

(56) References Cited

OTHER PUBLICATIONS

"Surface Hardening of AISI 304, 316, 304L, and 316L SS Using Cyanide Free Salt Bath Nitriding Process", T. Kumar, et al., International Symposium of Research Students on Materials Science and Engineering, Dec. 2002, Chennai India, Department of Metallurgical and Materials Engineering Indian Institute of Technology Madras.

"Vacuum Hardening High Strength Steels: Oil Versus Gas Quenching", J. Pritchard and S. Rush, Heat Treating Progress, vol. 7, No. 3, May/Jun. 2007, pp. 19-23.

"Design of Heat Treatment Cycles: A Case Study for Salt Bath Hardening of Tool Steel", S. Sahay, Tata Research Development & Design Centre, India, Nov. 2000, downloaded Feb. 13, 2013 from directories.industrialheating.com/copyright/
0e77f040abbb7010VgnVCM100000f932a8c0.

"Salt Bath Quenching", G. P. Dubal, Advanced Materials & Processes, Dec. 1999.

\* cited by examiner

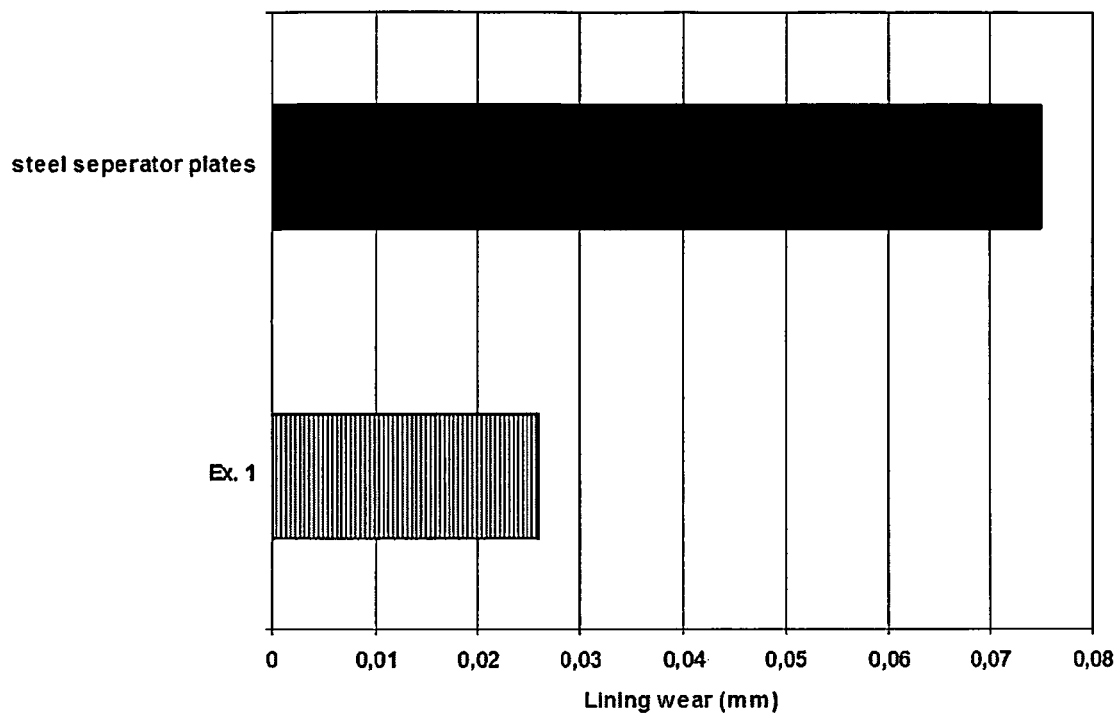

METHOD FOR PRODUCING A FRICTION ELEMENT

CROSS REFERENCE TO RELATED APPLICATIONS

Applicant claims priority under 35 U.S.C. §119 of Austrian Application No. A 2015/2010 filed on Dec. 3, 2010, the disclosure of which is incorporated by reference.

The invention relates to a method for producing a friction element comprising the steps: providing a metal main body and hardening the main body on at least one part of its surface in a salt bath, a friction element comprising a metal main body, which has a plurality of surfaces, wherein at least one of the surfaces is hardened by salt bath at least partly, a friction component comprising at least one first friction element and at least one second friction element, wherein the two friction elements can be arranged so as to be brought into friction closure with one another as well as the use of the friction element.

Such friction elements are used for example in disc couplings as so-called mating discs. The disc coupling usually comprises a plurality of discs. In this case a first group is arranged on a disc carrier in a rotationally and displacement secure manner and a second group on a hub. The two groups can be displaced relative to one another in axial direction and can be moved into and out of engagement in pairs.

The friction discs are designed in general to be annular and sandwich-like. They comprise a support sheet which is made for example of steel and which supports a friction lining on its annular surfaces. The latter usually consists of a fiber layer which is made e.g. of paper or a paper-like material and is soaked in an organic resin provided with friction particles. The mating discs are produced differently from a single piece of friction material. A mating disc of this kind is described e.g. in WO 97/32678 A1.

In said disc packets the lubrication of the individual components plays an important role. In particular, it must be ensured that lubricant oil reaches the friction surfaces. Therefore, reference is also made to so-called wet-running applications of the discs. The friction lining usually has in addition a porous structure, whereby a certain amount of oil saving is achieved. The saved oil is removed again during the friction closure of the disc with the mating disc and the resulting compression. In order to improve the oil delivery the friction lining normally comprises grooves for guiding the lubricating oil. The lubricant oil also performs the function of cooling the friction surfaces, in that the oil absorbs the frictional heat resulting from frictional closure and removes it via the grooves.

Mating discs usually do not have such grooves, whereby said mating discs are exposed to higher temperatures. It may occur in this case that the strength of the mating disc is reduced owing to the high temperature, in particular if the latter is made from an aluminum alloy. The use of aluminum alloys is advisable as the motor industry demands the reduction in weight of individual assemblies.

In order to overcome this problem of overheating the mating discs, in DE 199 06 980 A1 it is proposed to structure the surfaces of the discs so that oil pockets are formed. The oil pockets ensure that the friction surface at risk is covered by a residual lubricant oil supply even when the adjacent disc moved out of its axial perpendicular position bears in a grinding manner with its end edge against the said friction surface or centrifugal forces try to spin off the oil film. The structuring of the surface in this case only needs to be minimal, with minimal elevations and depressions. The structure only has to be designed so that an effective oil supply is available on or in the relevant friction surface. The structures of the surface and thereby of the said oil pockets can be microscopically small. However, they can also lie within the macro range. They can have the appearance of a fabric imprint. They can be formed in a different way, for example by laser processing of the disc-surfaces or also a chemical treatment, for example in an etching process in sintered linings.

It is also known in the prior art to harden the surfaces of mating discs, in particular the mating discs which do not have separate friction linings. One of the hardening methods used is salt bath hardening.

The objective of the present invention was to create a friction element with improved thermal stability.

This objective is achieved by means of the said method, in which the salt bath hardening is the final method step hardening, and there is no further processing of the hardened surface, and also by the friction element, in that the salt bath hardened surface is at least partly oxidized, where several different oxides are formed on the surface in discrete areas, by a friction component comprising the friction element according to the invention, and by the use of a salt bath hardened friction element as mating disc in a wet-running friction component with at least one additional friction element, wherein the additional friction element comprises an organic friction lining on a support element.

It is an advantage that by means of salt bath hardening a structured surface is formed, which as in DE 199 06 980 A1 serves as an oil storage area, wherein however, owing to the substances formed on the surface during salt bath hardening, in particular oxides, an adhesive bond is formed between the lubricant oil or additives of the lubricant oil, which are added to improve the tribological properties of the lubricant oil, i.e. the lubricant oil or its additives are available over a longer period also in the engaged position of the friction surfaces of the coupling. An additional effect of the method is that the production of the friction element is less expensive, as the final processing steps usually performed after the salt bath hardening, such as e.g. washing out the residues of the salt bath or polishing the surface of the friction element to remove the oxides formed, are omitted. By adding additives to the lubricant oil or oil molecules the coefficient of friction, the coefficient of friction path and the noise or vibration behavior can be improved, and there is also a reduction in wear, in particular in mating discs made of aluminum or aluminum alloys. By means of the at least partial formation of an oxide layer from different oxides the surface of the friction element in the region of the friction surface is given a different polarity, so that the adhesive binding of oil molecules and oil additives, which usually also have a different polarity, is improved. With said friction element the wear of a friction disc with an applied friction lining can be reduced.

Preferably, a salt bath is used which contains at least one salt of an inorganic acid, in particular a salt is selected from a group comprising or consisting of oxides, nitrates, nitrites, hydrogen nitrates, chlorides, carbonates and cyanides, so that the salt bath hardened surface comprises salt residues from the salt bath. Owing to the ionic bonding they are very polar salts, whereby the adhesive bonding of polar additives added to the lubricant oil to improve the tribological properties can be improved considerably.

Preferably, the salt bath hardening is performed at a temperature selected from a range with a lower limit of 150° C. and an upper limit of 450° C., as in this temperature range the rapid formation of oxidic bonds on the surface of the main body is achieved, from which a reduction of the processing time and thereby also a reduction in the production costs of the friction element is achieved. Furthermore, it was observed that by hardening in said temperature range the forming individual metal oxides are limited to discrete areas, whereby it should be noted that the whole friction surface of the friction element is covered with oxides after the salt bath hardening, which are of a size that is advantageous for the formation of lubricant areas, in particular also with respect to the noise reduction of the entire disc packet, i.e. the friction component. Said discrete areas in this case have a maximum diameter in plan view which is selected from a range with a lower limit of 50 µm and an upper limit of 300 µm.

Said discrete areas are preferably in the form of craters, which means that the amount of lubricant oil or lubricant additives stored therein can be increased.

For the same reasons alternatively or additionally the main body can be heated prior to salt bath hardening, in particular to a temperature selected from a range with a lower limit of 200° C. and an upper limit of 600° C.

As already mentioned above, by means of the method preferably friction elements are made from steel or aluminum or an aluminum alloy.

According to one embodiment variant of the friction element the oxides are arranged at least partly in several layers, whereby the storage capacity of the friction surface for oil molecules and lubricant additives can be improved.

Preferably, the friction element according to the invention is used in a motorbike coupling which, owing to the reduced amount of space available for the coupling and the pressure caused by high speed motors, is exposed to increased temperatures.

For a better understanding of the invention the latter is explained in more detail with reference to the following Figures.

In a schematically simplified representation:

FIG. 7 shows a diagram of the wear of a friction disc which was used in a friction packet with a friction element according to the invention as mating disc.

Figure 1:
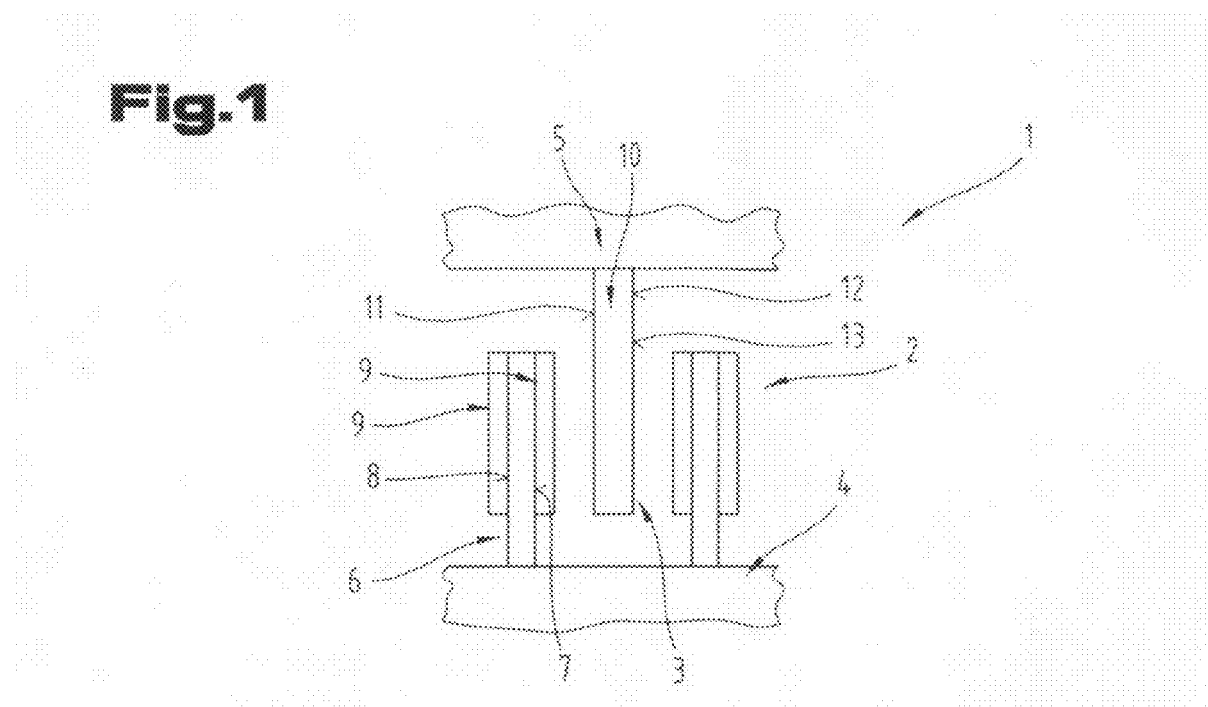
FIG. 1 shows a section of a disc packet in side view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows a section of friction component 1 of a disc coupling in side view. Said friction component 1 comprises at least one first friction element 2 and at least one second friction element 3. The at least one first friction element 2 is arranged on a shaft 4 and connected to be latter in a non-rotatable manner, the at least one second friction element 3 is arranged on a pin 5 and connected to the latter in a non-rotatable manner. The pin 5 is connected in a non-rotatable manner to an additional, not shown shaft. The shaft 4 and the pin 5 are adjustable relative to one another in axial direction, so that the friction elements 2, 3 enter into frictional closure with one another.

The number of shown friction elements 2, 3 should not be considered to be restrictive. Rather the number of friction elements 2, 3, i.e. friction discs, corresponds to the frictional power required. For example for each disc packet three, four, five, six, seven, eight, nine, ten to twenty etc. friction elements 2 or 3 can be combined into a friction component.

The friction element or elements 2, i.e. the friction discs, can be designed according to the prior art. They comprise or consist e.g. of a support element 6, which is formed in particular by a metal element, for example a steel ring, which is provided on at least one surface 7, preferably also on a surface 8 opposite said surface 7 in axial direction, with a friction lining 9 and joined thereto. The friction lining 9 or friction linings 9 can be made from an organic resin, which contains friction particles or friction-modifying particles and possibly fibers and hard materials and is mounted at least partly on a woven or non-woven fiber layer. As such embodiments of friction elements 2 are known from the prior art, reference is made to the relevant literature.

The friction elements 3 however, which are also defined in technical terms as mating discs, are only formed as a metal element without friction lining. In this case a metal main body 10 has at least on one surface 11, preferably also on a surface 12 opposite said surface 11 in axial direction, a friction surface 13, which is preferably as large as the respective surface of the friction lining 9 bearing against said friction surface 13 in the engaged state of the disc packet in frictional closure.

The main body 10 of the friction element 3 can either be made of a sintered material or preferably of a solid material, wherein in the latter case the main body 10 is cut or stamped from a corresponding plate-like raw material, however, also a casting method is possible in principle. Preferably, the main body 10 is made of steel or a steel alloy or aluminum or an aluminum alloy. In principle however, other materials can also be used which are accessible to the salt bath hardening.

Preferably, the friction elements 3, i.e. the mating discs, are used in couplings, in particular motorbike couplings. In principle, said friction elements 3 can also be used in other friction components e.g. such as single and multiple synchronizations, uncontrolled and controlled distributor gears, brakes, differential locks, torque vectoring applications, etc. as mating discs.

The friction element 3 is intended for so-called wet running applications, i.e. applications in which the latter is wetted with a lubricant and coolant, for example in particular a synthetic oil. In their basic form such friction discs are known from the prior art in all kinds of different geometric shapes which correspond with the respective application. As this would be known to a person skilled in the art, reference is made to the relevant literature.

According to the invention the main body 10 of the friction elements 3 is hardened by salt bath at least in the area of the friction surface(s) 13, which forms the last processing step for the production of the friction element 3—with the exception of quality control and packaging—in the method according to the invention. In addition, said main body 10 is immersed in a salt bath after the main shaping and possible deburring or degreasing.

In principle, the salt bath can have a composition which corresponds to the prior art in relation to salt bath hardening. Preferably, the salt bath contains at least one salt of an inorganic acid, in particular a salt, for example an alkaline salt or alkaline earth salt, selected from a group comprising or consisting of oxides, nitrates, hydrogen nitrates, nitrites, chlorides, carbonates, cyanides.

For example, the salt bath can be composed according to the following data or comprise said components:

EXAMPLE 1

25 wt. % to 35 wt. % barium chloride
35 wt. % to 45 wt. % potassium chloride 15 wt. % to 25 wt. % sodium chloride
5 wt. % to 15 wt. % lithium chloride

EXAMPLE 2

60 wt. % barium chloride
10 wt. % sodium cyanide
30 wt. % sodium carbonate

EXAMPLE 3

55 wt. % barium chloride
15 wt. % potassium cyanide
30 wt. % sodium carbonate

In particular the salt bath consists of nitrates

For the salt bath hardening the salt bath is heated to the temperature at which the salts are melted. Preferably however, a temperature is chosen which is selected from a range with a lower limit of 150° C., in particular 200° C., and an upper limit of 450° C., in particular 300° C.

Alternatively or preferably, in addition the main body 10 can be heated to a temperature, which is selected from a range with a lower limit of 200° C., in particular 250° C., and an upper limit of 600° C., in particular 500° C. For example, the temperature of the main body 10 can be between 300° C. and 600° C., if the latter is made of steel, or between 200° C. and 250° C., if the latter is made of aluminum or an aluminum alloy, such as e.g. Aludur (aluminum alloy with Si, Mn and Mg), Aluman (aluminum alloy with 1.1 wt. % Mn), Duraluminum (aluminum alloy with 2.5 wt. % to 5.5 wt. % Cu, 0.2 wt. % to 5 wt. % Mg).

The main body 10 is left in the salt bath for a period of between 5 minutes, in particular 10 minutes, and 40 minutes, in particular 20 minutes.

Afterwards the main body 10 is removed from the salt bath again, wherein excess liquid salt bath contents are removed by letting them run off. The main body is then cooled in air at room temperature, i.e. ambient temperature, or below inert gas atmosphere (N2 and/or He, etc.), or in an oil bath.

Figure 2:
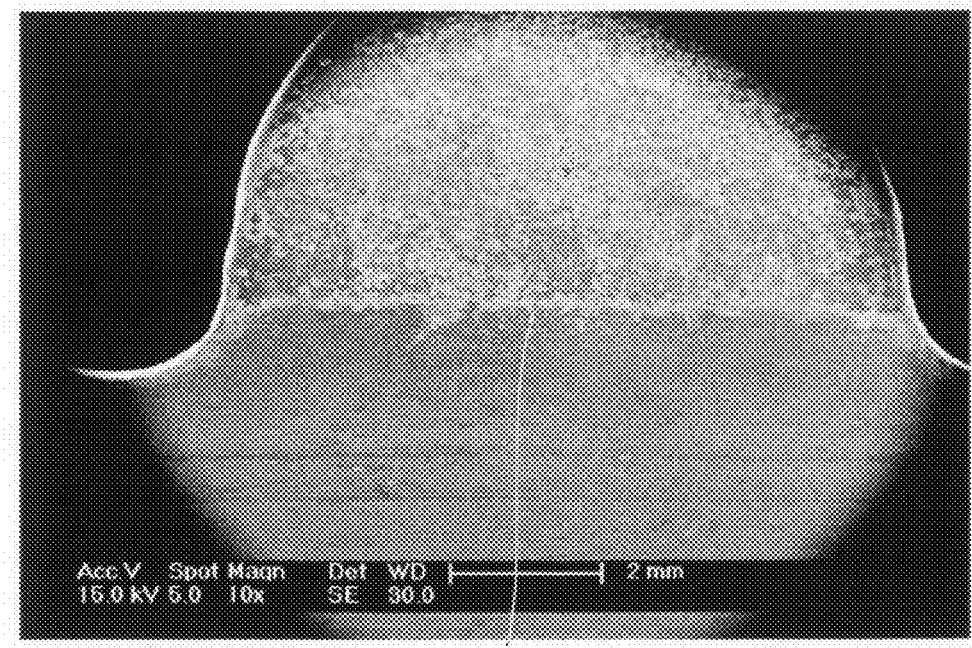
FIGS. 2 to 4 shows different images of the frictional surface of a friction element.
Figure 3:
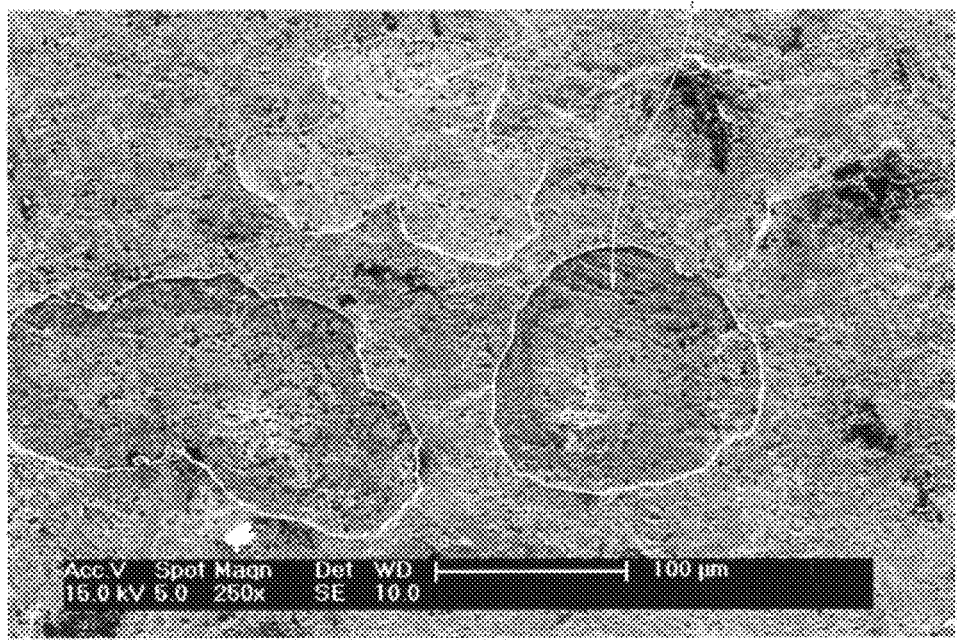

The salt bath hardened main body 1 now has one or two salt bath hardened friction surface(s) 13, which are oxidized at least partly, but preferably completely, wherein several different oxides are formed on both the surface 11 and/or 12 of the main body 10 in discrete areas. FIGS. 2 to 3 both show sections in different enlargements of a friction surface 13 of a steel mating disc which was hardened in a salt bath made of nitrates at a temperature of 200° C. for a period of 10 minutes.

It can be seen clearly from these Figures, that the oxides formed, in particular Fe2O3, NaOH, $K_2O$, KOH, $K_2CO_3$, are present in their own discrete areas 14, wherein said areas comprise a single oxide or mixed oxide, i.e. the different oxides are formed on the surface 11, 12 of the main body 10 next to one another respectively, where the term "next to one another" does not mean "adjacent". Said discrete areas 14 have in particular a maximum diameter in plan view, which is selected from a range with a lower limit of 50 µm, in particular 75 µm, and an upper limit of 300 µm, in particular 200 µm.

Preferably, said areas 14 are designed to be at least partly crater-like, in particular with a crater depth of between 2 µm, in particular 5 µm, and 20 µm, in particular 10 µm.

The oxides can also be arranged at least partly in several layers, for example between one and four layers. This can be adjusted by the temperature of the salt bath, the temperature of the main body 10, at which the latter enters the salt bath and by the period the main body 10 stays in the salt bath.

Figure 4:
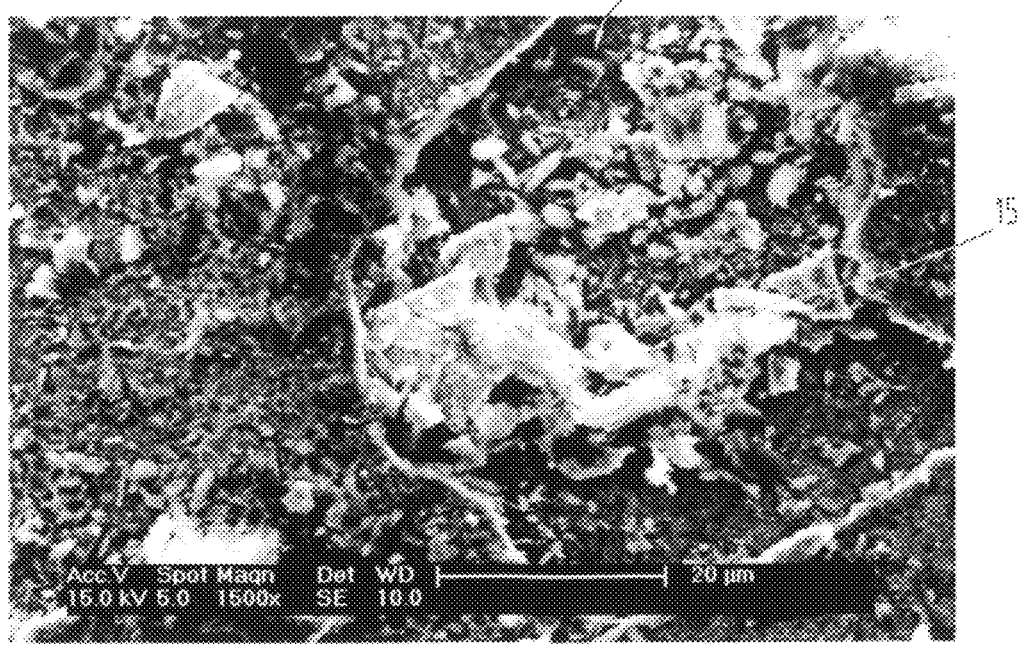

Preferably, the salt bath hardened friction surface or surfaces 13 comprises or comprise at least partly salt residues 15 from the salt bath, as shown in FIG. 4, wherein said salt residues 15 are located in particular within the (crater-like) discrete areas 14.

In the following several examples of friction elements 3 and comparison examples are given together with the corresponding measurement values of the investigations.

By means of an EDX analysis (Energy-dispersive X-ray spectroscopy) it could be established that on the friction surface 13 the salts $NaNO_3$, $KNO_3$ and $K_2CO_3$ are found in a concentration of 2 wt. % to 22 wt. % $NaNO_3$, 1 wt. % to 18 wt. % $KNO_3$ and 1 wt. % to 2 wt. % $K_2CO_3$. The main body 10, i.e. its friction surfaces 13, is colored black or has black coloring.

Figure 5:
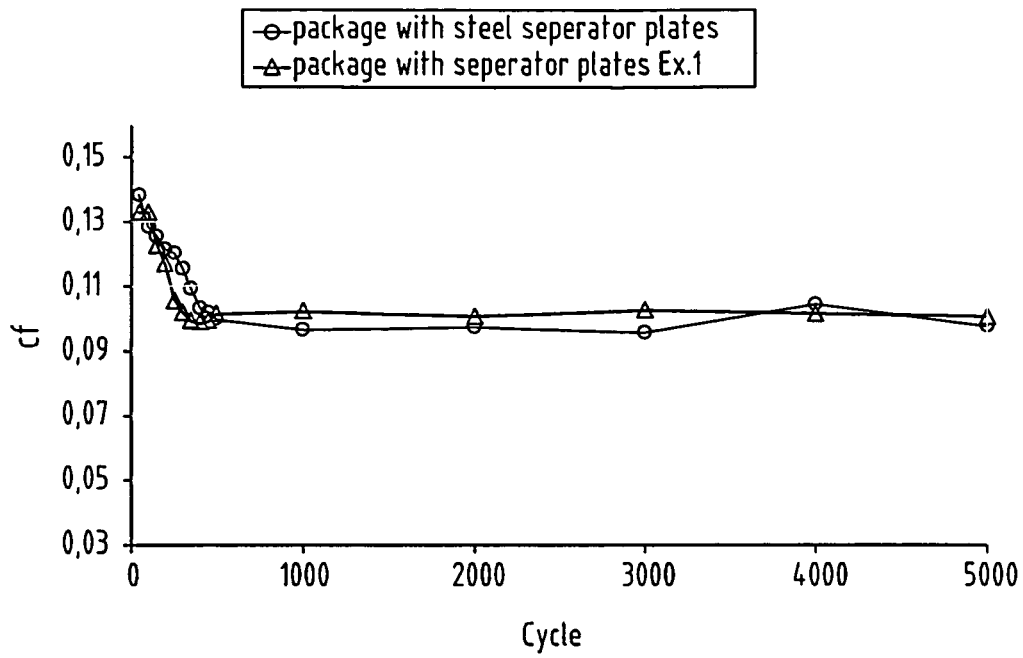
FIG. 5 shows a diagram of the path of the coefficients of friction as a function of the number of shifting cycles.
Figure 6:
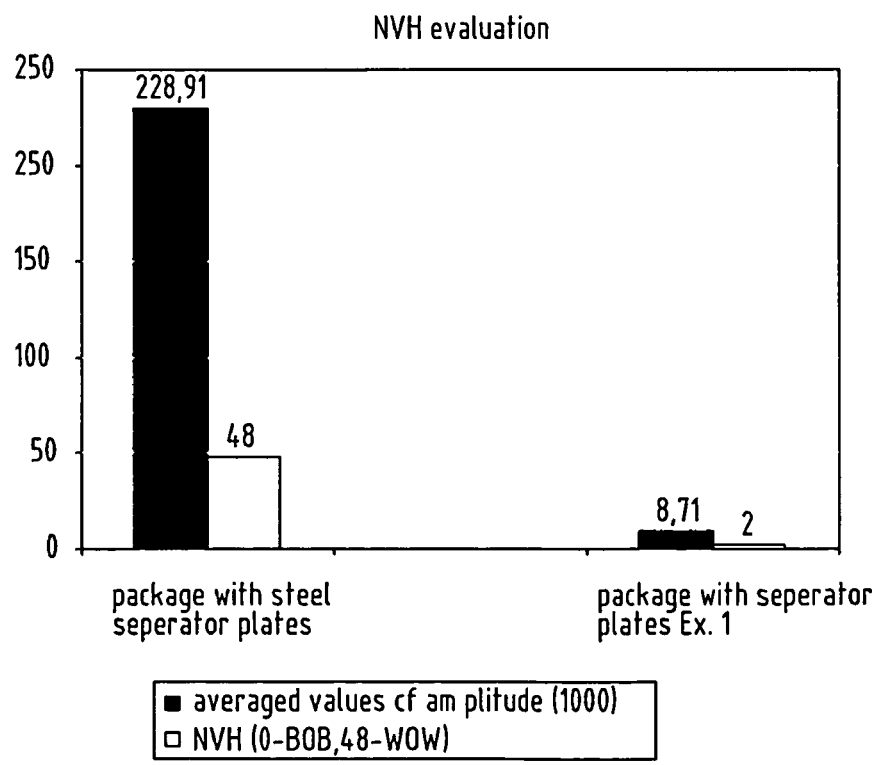
FIG. 6 shows a diagram of the NVH behavior.

FIGS. 5 to 7 show different diagrams of the characteristic values of a friction element 3 made of steel according to the invention produced by using a salt bath according to Example 1 compared to a mating disc made of steel according to the prior art. Said mating discs were tested respectively in a friction component with the same friction disc according to the prior art.

FIG. 5 shows the frictional behavior of the friction element 3 according to the invention as well as the mating disc according to the prior art over time, i.e. the number of shift cycles, which are entered on the x-axis. The coefficient of friction cf is entered on the y-axis. It can be seen that the friction element 3 according to the invention (triangles) provides comparable values to the mating disc according to the prior art, wherein however as considered over the number of shift cycles after a running in phase the friction element 3 according to the invention has a more constant coefficient of friction path. Since there are no standardized testing methods, the measurements were made under the following test conditions: p spec. [N/mm$^2$] 3-9, v [m/s] 0.18-0.45, theoretic friction moment [Nm] 200-1000.

FIG. 6 shows a diagram of the NVH behavior (Noise, Vibration and Harshness behavior) of the friction element 3 according to the invention and the mating disc according to the prior art. The vibration intensity of the friction moment is shown (averaged values cf amplitude). In the NVH assessment a noise point is allocated at each pressure stage (max. 2), if cf-amplitude is greater than 0.025. It can be seen clearly that in this test the friction element 3 according to the invention (right bar) was significantly better than the mating disc according to the prior art.

The abrasion resistance (wear) shown in FIG. 7 was determined by a wall thickness measurement of a friction disc used with the mating disc before and after the test run, as the mating disc according to the invention has a positive effect on the wear resistance of the friction disc. In this case the wear is entered on the x-axis in [mm]. As shown clearly, the friction disc (lower bar) used with the mating disc according to the invention, i.e. the friction element 3, under the same conditions shows much lower wear than a friction disc of the same composition, which was run with a mating disc according to the prior art (top bar).

The exemplary embodiments show possible embodiment variants of the friction component 1 and the friction element 3, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Finally, as a point of formality, it should be noted that for a better understanding of the structure of the friction component 1 or the friction element 3 the latter and its components have not been represented to scale in part and/or have been enlarged and/or reduced in size.

LIST OF REFERENCE NUMERALS

1. Friction component
2. Friction element
3. Friction element
4. Shaft
5. Pin
6. Support element
7. Surface
8. Surface
9. Friction lining
10. Main body
11. Surface
12. Surface
13. Friction surface
14. Area
15. Salt residue

The invention claimed is:

1. A method for producing a friction element comprising the steps:
   providing a metal main body,
   hardening the main body on at least one part of its surface in a salt bath, the salt bath comprising a mixture of different salts,
   forming several different oxides in discrete areas on the surface of the main body, the different oxides being present in respective discrete areas next to one another, wherein the discrete areas have a maximum diameter in plan view which is selected from a range with a lower limit of 50 μm and an upper limit of 300 μm and wherein the discrete areas are designed to be at least partly crater-shaped with a crater depth of between 2 μm and 20 μm, and
   forming a hardened surface comprising salt residues from the salt bath, wherein the salt residues are located within the discrete areas, and wherein the salt bath hardening is the final step of the method and there is no further processing of the hardened surface.

2. The method as claimed in claim 1, wherein the salt bath contains at least one salt of an inorganic acid.

3. The method as in claim 1, wherein the salt bath contains at least one salt selected from the group consisting of oxides, nitrates, hydrogen nitrates, nitrites, chlorides, carbonates and cyanides.

4. The method as claimed in claim 1, wherein the salt bath hardening is performed at a temperature which is selected from a range with a lower limit of 150° C. and an upper limit of 450° C.

5. The method as claimed in claim 1, wherein the main body is heated prior to salt bath hardening.

6. The method as claimed in claim 5, wherein the body is heated to a temperature, which is selected from a range with a lower limit of 200° C. and an upper limit of 600° C.

7. The method as claimed in claim 1, wherein the main body is made of steel or aluminum or an aluminum alloy.

* * * * *